(12) United States Patent
Sakurabu

(10) Patent No.: US 8,670,061 B2
(45) Date of Patent: Mar. 11, 2014

(54) PHOTOGRAPHY DEVICE AND DISPLAY CONTROL METHOD

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/015,440

(22) Filed: Aug. 30, 2013

(65) Prior Publication Data

US 2014/0002709 A1 Jan. 2, 2014

Related U.S. Application Data

(63) Continuation of application No. PCT/JP2012/052782, filed on Feb. 7, 2012.

(30) Foreign Application Priority Data

Mar. 4, 2011 (JP) ................................. 2011-048041

(51) Int. Cl.
*H04N 5/222* (2006.01)
*H04N 5/225* (2006.01)

(52) U.S. Cl.
USPC .................. 348/333.08; 348/333.01; 348/341

(58) Field of Classification Search
None
See application file for complete search history.

(56) References Cited

U.S. PATENT DOCUMENTS

| 7,535,498 | B2 * | 5/2009 | Segman | 348/239 |
|---|---|---|---|---|
| 8,078,049 | B2 * | 12/2011 | Oikawa | 396/374 |
| 8,169,529 | B2 * | 5/2012 | Kajimura | 348/341 |
| 2006/0146169 | A1 * | 7/2006 | Segman | 348/335 |
| 2007/0019944 | A1 | 1/2007 | Ikeda et al. | |
| 2010/0002109 | A1 * | 1/2010 | Kajimura | 348/294 |
| 2010/0003025 | A1 * | 1/2010 | Oikawa | 396/374 |
| 2010/0245557 | A1 * | 9/2010 | Luley et al. | 348/79 |

FOREIGN PATENT DOCUMENTS

| JP | 3-292067 A | 12/1991 |
|---|---|---|
| JP | 6-22185 A | 1/1994 |
| JP | 2002-090814 A | 3/2002 |
| JP | 2003-78785 A | 3/2003 |
| JP | 2007-28390 A | 2/2007 |

\* cited by examiner

*Primary Examiner* — Nicholas Giles
(74) *Attorney, Agent, or Firm* — Birch, Stewart, Kolasch & Birch, LLP

(57) ABSTRACT

There is provided a photography device including: a display control section; a guiding section; and a guiding control section that, in a state in which the optical image has been guided to the eyepiece portion and the electronic image and the composite image have not been guided to the eyepiece portion, if the photographing conditions are changed, carries out first control that controls the guiding section such that the composite image is guided to the eyepiece portion, and, if a predetermined time elapses after the first control or a predetermined operation is carried out by a user after the first control, carries out second control that controls the guiding section such that the optical image is guided to the eyepiece portion and the electronic image and the composite image are not guided to the eyepiece portion.

9 Claims, 17 Drawing Sheets

HVF
(SIMULTANEOUS DISPLAY OF OVF AND EVF)

OVF

EVF

HVF
(SIMULTANEOUS DISPLAY
OF OVF AND EVF)

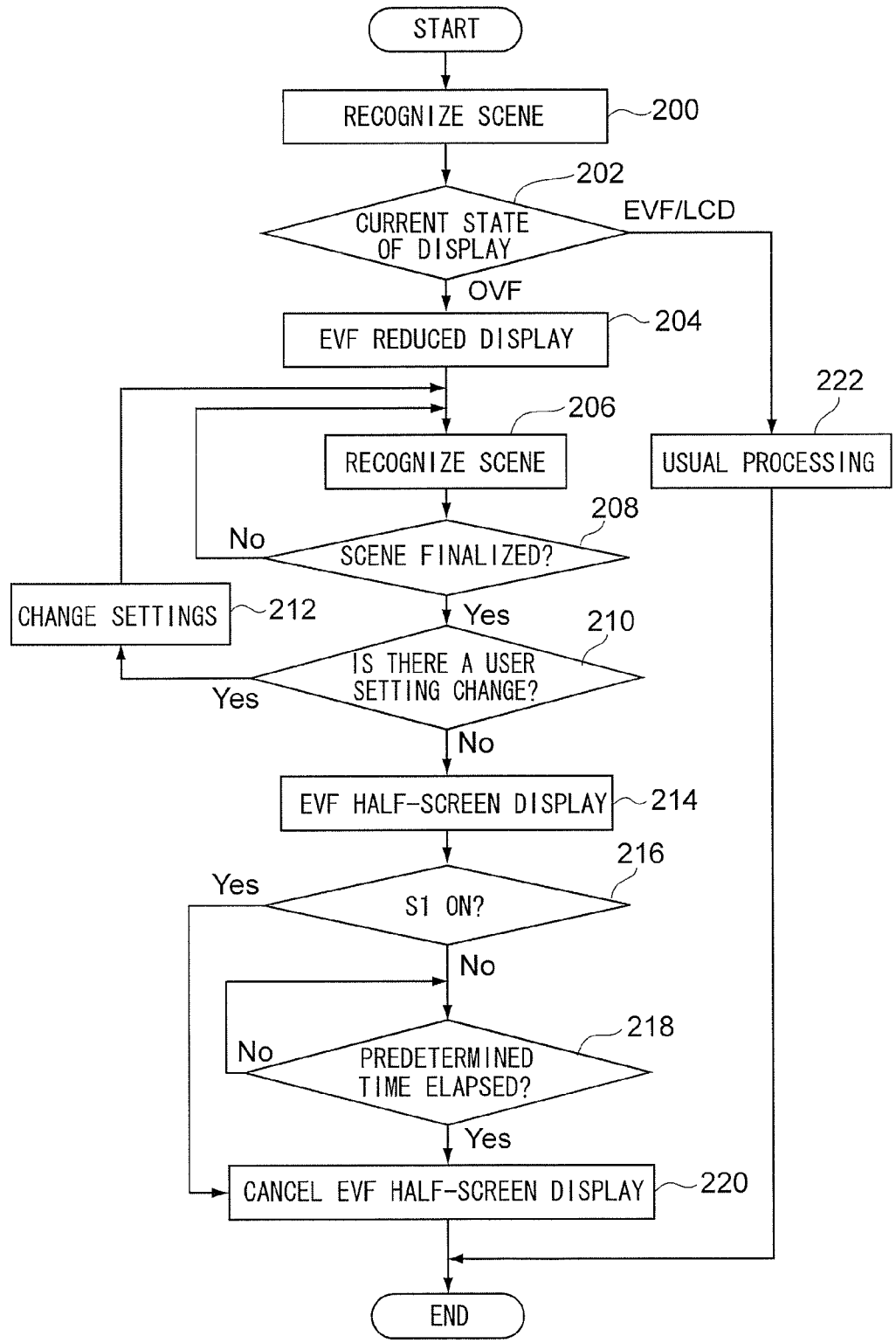

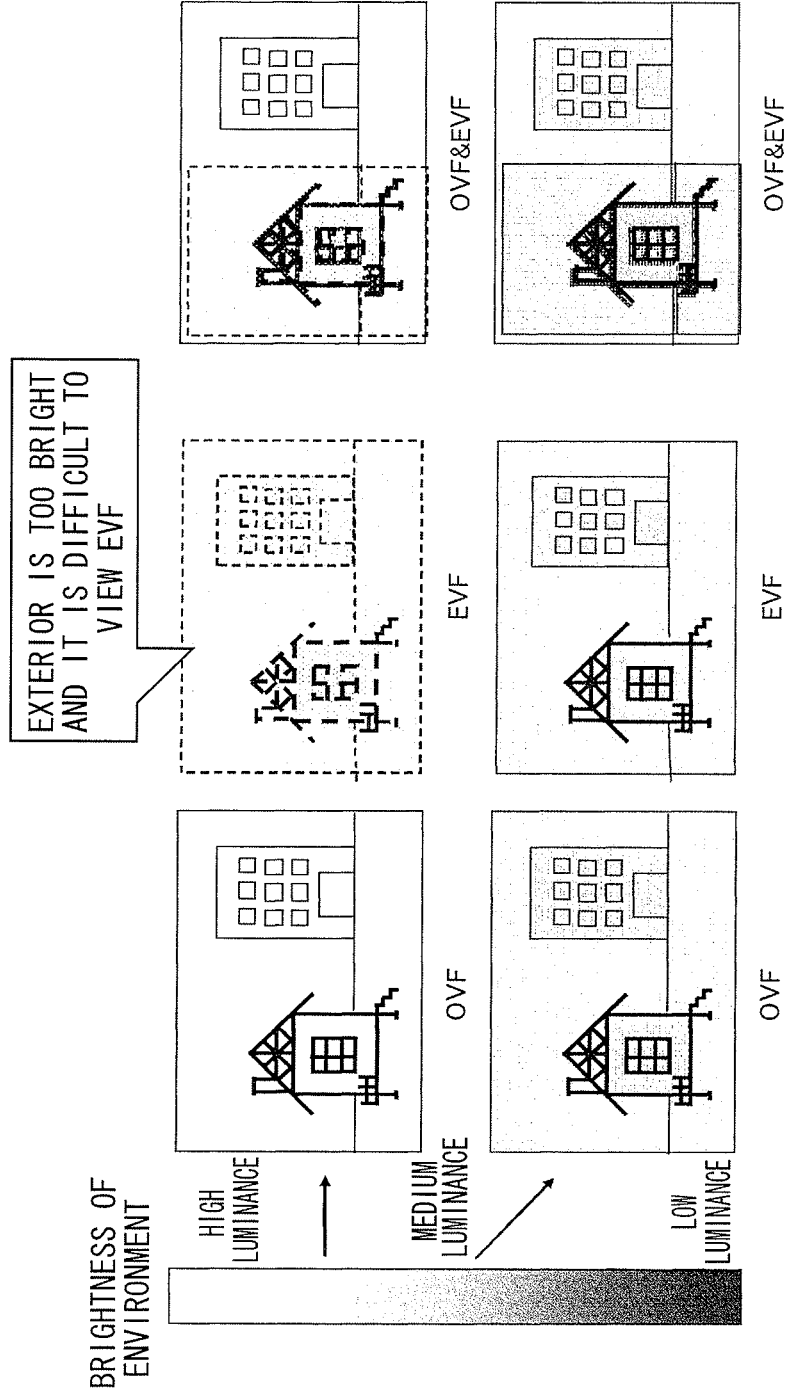

FINDER SHUTTER

EVF   OVF

OVF

EVF

HVF
(SUPERPOSED ON HALF SCREEN)

HVF
(SUPERPOSED ON VICINITY OF FACE)

HVF WITHOUT PARALLAX
CORRECTION

HVF WITH PARALLAX
CORRECTION

PHOTOGRAPHY DEVICE AND DISPLAY CONTROL METHOD

CROSS-REFERENCE TO RELATED APPLICATIONS

This application is a continuation application of International Application No. PCT/JP2012/052782, filed Feb. 7, 2012, the disclosure of which is incorporated herein by reference in its entirety. Further, this application claims priority from Japanese Patent Application No. 2011-048041, filed Mar. 4, 2011, the disclosure of which is incorporated herein by reference in its entirety.

BACKGROUND

1. Technical Field

The present invention relates to a photography device and a display control method that are equipped with an optical view finder (OVF), that displays an optical image that is inputted optically, and an electrical view finder (EVF) mode, that displays an electronic image that has been picked-up by the image pickup element, that are finders that specify and display at least an image pickup range.

2. Related Art

There has conventionally been proposed a hybrid view finder (HVF) that has an optical system that leads an optical image, that is incident on an optical (or frame) view finder (OVF), and an electronic image, that is displayed by an electronic view finder (EVF), respectively via half-mirrors to an eyepiece portion (refer to Japanese Patent Application Laid-Open No. 3-292067).

At an OVF, an image that has been transmitted through a lens reaches the eyes of the user directly or via a mirror, and therefore, image capturing that has good immediacy and no electronic time lag with respect to the motion of the photographic subject is possible. On the other hand, at an OVF, the setting effects of the photographing conditions, such as the exposure settings, the white balance (WB), depth of field, and the like are not displayed such as at an EVF, and therefore, the user cannot know of the setting effects. Thus, when photographing is carried out by using an OVF and at the usual automatic settings as are, depending on the conditions, it is possible for failures to occur such as out of focus occurring, or night views being too light, or the WB not being suitable, or the like.

In order to avoid such failures, the effects of the current photographing conditions must be conveyed to the user in real time. However, in order for the user to confirm the setting effects of these photographing conditions, the finder must be changed to EVF once. This switching of the display of the finder is inconvenient for the user, and it is difficult to say that the user can grasp the situation in real time.

Further, in cases of making the exposure and the WB match the standards, such as in the case of automatic settings, an OVF may be used as the finder. However, when the photographing settings are to be changed drastically such as in scene recognition or the like, the effects thereof differ greatly from an OVF image, and therefore, there is the possibility that the user will feel a sense of incongruity. Accordingly, it is difficult to carry out settings for photographing by using OVF that cannot provide the user with information relating to the setting effects in real time.

Note that, as described in Japanese Patent Application Laid-Open No. 3-292067, with an HVF, in addition to using the OVF and the EVF separately by switching therebetween (in the EVF, closing the OVF window (finder shutter)), a method of use in which an EVF image is superposed on an OVF image without closing the finder shutter also is possible.

However, the aforementioned related art (Japanese Patent Application Laid-Open No. 3-292067) does not mention the time of switching the display state of the finder, and does not in any way disclose a technique of, when changing the photographing settings at the time of using an OVF, providing the user with the photographing effects in real time without deteriorating the feeling of use (the immediacy) of the OVF.

SUMMARY

In consideration of the above-described circumstances, an object of the present invention is to provide a photography device and a display control method that, when a change in photographing conditions is carried out at a time when an optical image is displayed and an electronic image or a composite image is not displayed at an eyepiece portion, can provide the user with the effects of changing the photographing conditions in real time, without deteriorating the immediacy of the optical image.

A photography device of the present invention includes: a display control section that effects control such that an electronic image, that is obtained by capturing a photographic subject via a photographic lens and that corresponds to set photographing conditions, is displayed on a display portion; a guiding section that guides, to an eyepiece portion, at least one of an electronic image displayed on the display portion and an optical image of the photographic subject that is incident optically, or a composite image that merges both; and a guiding control section that, in a state in which the optical image has been guided to the eyepiece portion and the electronic image and the composite image have not been guided to the eyepiece portion, when the photographing conditions are changed, carries out first control that controls the guiding section such that the composite image is guided to the eyepiece portion, and, when a predetermined time elapses after the first control or a predetermined operation is carried out by a user after the first control, carries out second control that controls the guiding section such that the optical image is guided to the eyepiece portion and the electronic image and the composite image are not guided to the eyepiece portion.

In this way, in a case in which the photographing conditions are changed in a state in which the electronic image and the composite image have not been guided to the eyepiece portion and the optical image has been guided to the eyepiece portion, control is carried out such that the composite image is guided to the eyepiece portion. Thereafter, when a predetermined times elapses or when a predetermined operation is carried out by the user, control is carried out such that the optical image is guided to eyepiece portion and the electronic image and the composite image are not guided to the eyepiece portion. Therefore, the effects of changes in the photographing conditions can be provided to the user in real time without deteriorating the immediacy of the optical image.

Note that the photography device of the present invention has the feature of further including: a scene recognizing section that recognizes a photographed scene; and a changing section that changes the photographing conditions in accordance with the photographed scene recognized by the scene recognizing section.

Note that, during a time period when the first control by the guiding control section is being carried out, the display control section may effect control such that a luminance of the electronic image becomes a luminance at which viewability of the electronic image improves.

Further, the composite image that is guided to the eyepiece portion may be an image in which at least a portion of the electronic image is disposed at a predetermined region of the optical image.

Still further, the photography device of the present invention may further include a comparing section that compares luminance of the electronic image and brightness of the photographing environment, and, in a case in which it is judged, on the basis of results of comparison of the comparing section, that the viewability of the electronic image will not improve even if the luminance of the electronic image is adjusted, the guiding control section may control the guiding section such that a composite image, that is obtained by light-blocking an image of the predetermined region of the optical image, is guided to the eyepiece portion.

Further, the photography device of the present invention may further include a comparing section that compares luminance of the electronic image and brightness of the photographing environment, and, in a case in which it is judged, on the basis of results of comparison of the comparing section, that the viewability of the electronic image will not improve even if the luminance of the electronic image is adjusted, the guiding control section may carry out, instead of the first control, third control that controls the guiding section such that the electronic image is guided to the eyepiece portion and the optical image and the composite image are not guided to the eyepiece portion.

Further, there may be further comprised a detecting section that detects a position of a photographic subject from the electronic image, and the composite image that is guided to the eyepiece portion may be an image in which the electronic image, that includes the photographic subject, is superposed on the detected position of the optical image.

Further, the photography device of the present invention may further include: a measuring section that measures a photographic subject distance; and a correction amount computing section that, on the basis of the measured photographic subject distance, computes a correction amount for correcting offset between the electronic image and the optical image, and the composite image that is guided to the eyepiece portion may be an image in which the electronic image, that includes the detected photographic subject, is superposed on a position, that is obtained by correcting the detected position in accordance with the computed correction amount, of the optical image.

Further, a display control method of the present invention has the feature of: effecting control such that an electronic image, that is obtained by capturing a photographic subject via a photographic lens and that corresponds to set photographing conditions, is displayed on a display portion; and, in a state in which, by a guiding section that guides, to an eyepiece portion, at least one of an electronic image displayed on the display portion and an optical image of the photographic subject that is incident optically, or a composite image that merges both, the optical image has been guided to the eyepiece portion and the electronic image and the composite image have not been guided to the eyepiece portion, when the photographing conditions are changed, carrying out first control that controls the guiding section such that the composite image is guided to the eyepiece portion, and, when a predetermined time elapses after the first control or a predetermined operation is carried out by a user after the first control, carrying out second control that controls the guiding section such that the optical image is guided to the eyepiece portion and the electronic image and the composite image are not guided to the eyepiece portion.

Because the display control method of the present invention also operates similarly to the photography device of the present invention, the effects of changes in the photographing conditions can be provided to the user in real time without deteriorating the immediacy of the optical image.

As described above, in accordance with the present invention, the effects of changes in photographing conditions can be provided to a user in real time without deteriorating the immediacy of an optical image.

BRIEF DESCRIPTION OF THE DRAWINGS

An exemplary embodiment of the present invention will be described in detail based on the following figures, wherein:

FIG. 7 is a flowchart illustrating an example of the flow of display switching control; processing at a time of executing a scene recognition function.

FIG. 8 is an explanatory drawing that explains states in which an EVF image becomes difficult to see in accordance with the brightness of the environment;

DETAILED DESCRIPTION

Figure 1A:
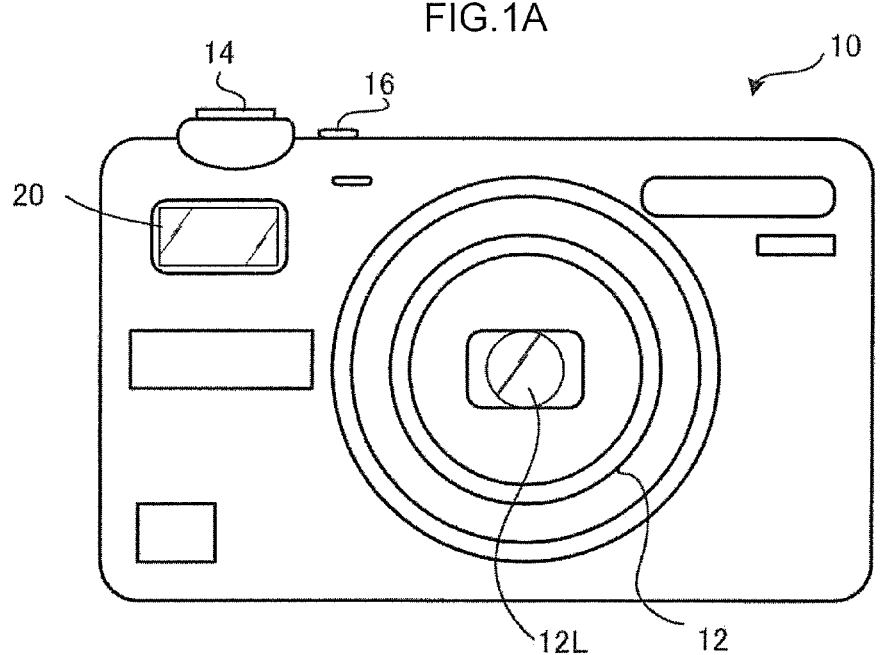
FIG. 1A is a front view of a digital camera relating to a present embodiment.

As shown in FIG. 1A, a lens barrel 12 having a lens 12L for image-forming an image of a photographic subject is provided at the front surface of a digital camera 10 that serves as a photography device. A release button (a so-called shutter) 14, that is push-operated by the user at the time of executing image pickup (photography), and a power switch 16 are provided at the top surface.

Note that the release button 14 relating to the present embodiment is structured so as to be able to detect push-operations of two stages that are a state in which the release button 14 is pushed-down to an intermediate position (hereinafter called "half-depressed state" or "S1 on state"), and a state in which the release button 14 is pushed-down to a final pushed-down position that is past the intermediate position (hereinafter called "fully depressed state" or "S2 on state").

The digital camera 10 is structured such that, due to the release button 14 being set in the aforementioned half-depressed state, an AE (Automatic Exposure) function works and the exposure state (shutter speed, state of the diaphragm) is set, and thereafter, an AF (Auto Focus) function works and the focus is controlled, and in continuation thereafter, image capturing (photography) is possible when the release button 14 is set in the aforementioned fully depressed state. Note that the digital camera 10 is structured such that the photographing conditions of the exposure and the like can be set manually by the user, and not only by automatic control.

Figure 1B:
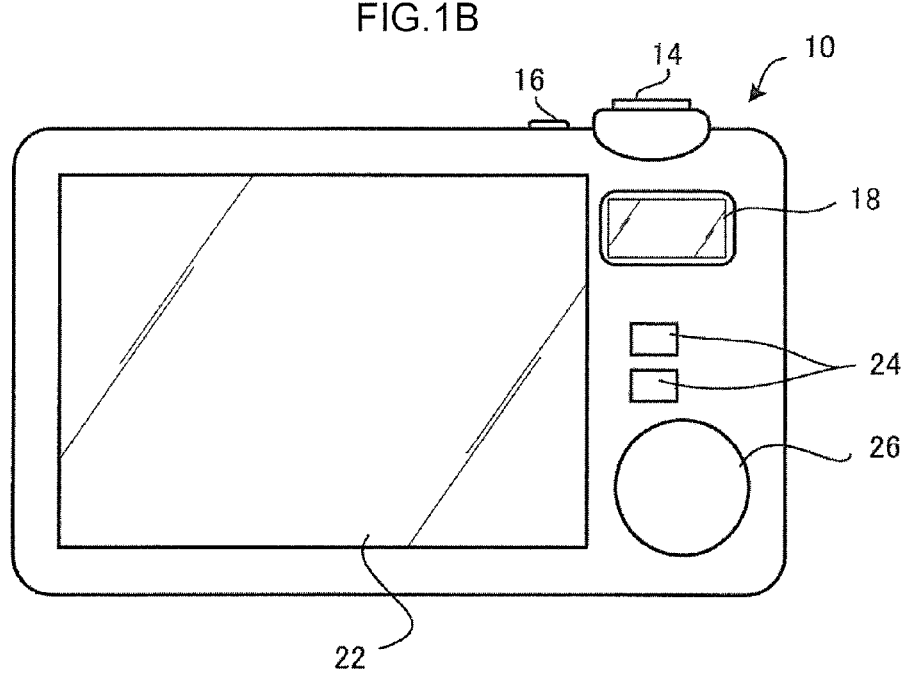
FIG. 1B is a rear view t of the digital camera relating to the present embodiment.

On the other hand, as shown in FIG. 1B, an eyepiece portion 18, that is used as both an optical view finder (hereinafter called "OVF") and an electrical view finder (hereinafter called "EVF"), is provided at the rear surface of the digital camera 10. Note that an objective lens 20 is disposed at the front surface (see FIG. 1A) of the digital camera 10 so as to oppose the eyepiece portion 18.

Further, a rear surface LCD 22 that is for displaying the image of the photographic subject expressed by the digital image data obtained by photographing, and various types of menu screens, messages and the like, mode switching switches 24 that are operated in order to set the mode to either of a photographing mode that is a mode that carries out photographing or a playback mode that is a mode that displays (plays-back) on the rear surface LCD 22 the image of the photographic subject expressed by the digital image data obtained by photographing, and a cross cursor button 26 that is structured to include a total of five keys that are four arrow keys that show moving directions of four directions that are up, down, left, right in the display region of the rear surface LCD 22 and an OK key that is positioned at the central portion of these four arrow keys, are provided at the reverse surface of the digital camera 10. Note that the input operation system is not limited to the above-described mode switching switches 24 and cross cursor button 26, and the rear surface LCD 22 may be provided with the functions of a touch panel 22TP (see FIG. 2). Accordingly, when collectively referring to the entire input operation system as needed, there are cases in which it is called an "operation section 28 (see FIG. 2)".

Figure 2:
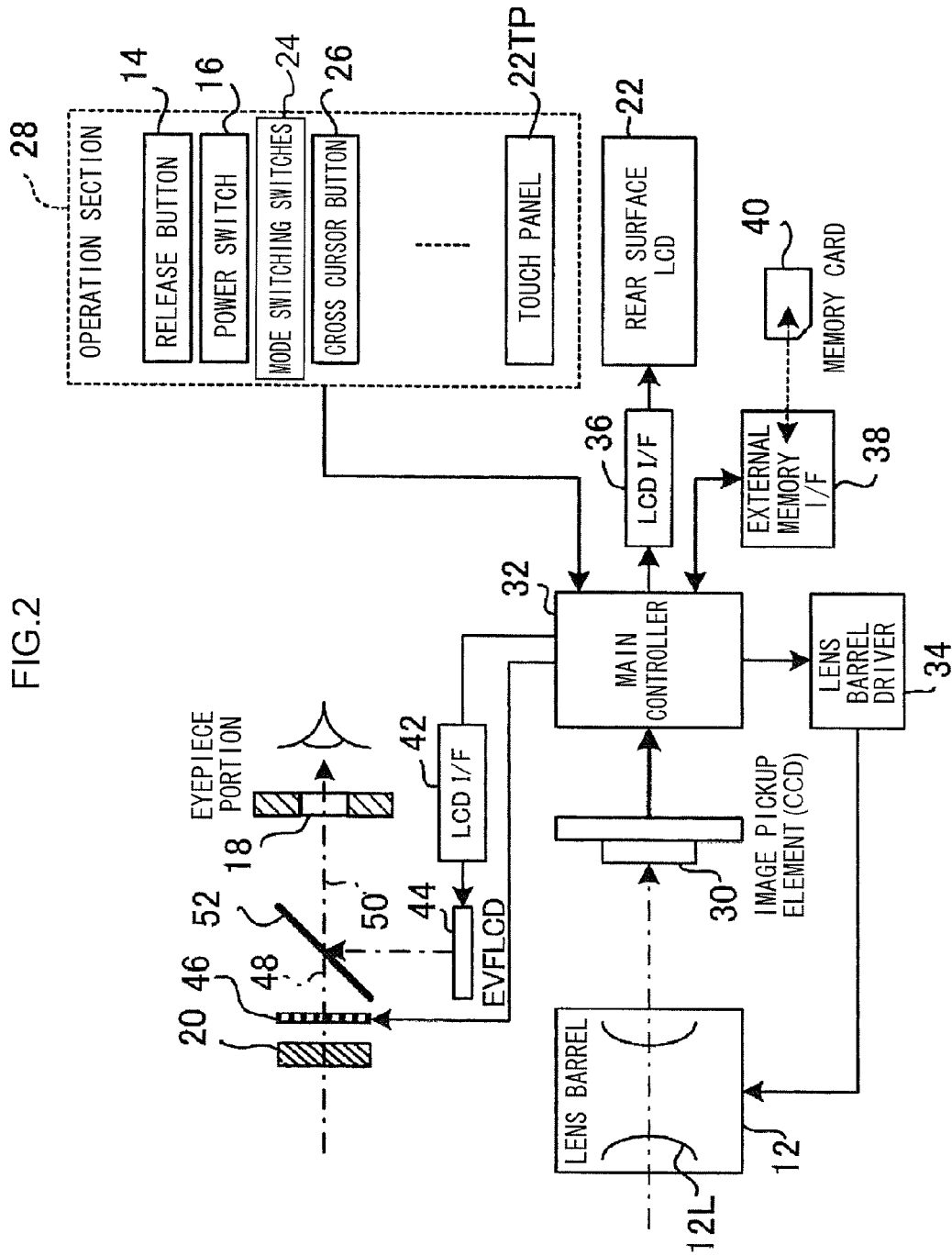
FIG. 2 is a schematic block drawing illustrating the internal structure of the digital camera relating to the present embodiment.

The optical path structure of the interior of the digital camera 10, and a control block diagram that is the hardware resources of control that carry out processings on picked-up images, are shown in FIG. 2.

Light that is incident from the lens 12L of the aforementioned lens barrel 12 is received at an image pickup element (a CCD 30 in the present embodiment, but may be a CMOS or the like), and is converted into electric signals. The electric signals that correspond to the incident light are inputted to a main controller 32, and various types of processings are executed thereon. A lens barrel driver 34 is connected to the main controller 32, and moves the lens barrel 12 in the optical axis direction, and changes the photographing magnification and the focal length. Note that it is also possible to provide a shutter device at the CCD 30, and control the charge accumulating time of the CCD 30 by controlling the shutter speed of this shutter device.

Further, the aforementioned rear surface LCD 22 is connected to the main controller 32 via an LCD I/F 36, and the operation section 28, that includes the mode switching switches 24 and the cross cursor button 26, is connected to the main controller 32 (in a case in which the rear surface LCD 22 is provided with a touch panel function, this touch panel 22TP also is included).

Moreover, an external memory I/F 38 (used as both a reader/writer) is connected to the main controller 32, and records image data onto a memory card 40 that is loaded in this external memory I/F 38, and acquires image data from the memory card 40.

Here, in the present embodiment, in order to realize a finder (a hybrid view finder, hereinafter called HVF) that is used both as an EVF and an OVF, an EVF LCD 44 is connected as a display portion to the main controller 32 via an LCD I/F 42, and a finder shutter 46 serving as a light blocking portion is connected to the main controller 32. The finder shutter 46 is opened when an OVF image (optical image) is guided to the eyepiece portion 18, and is closed when only an EVF image (an electronic image) is guided to the eyepiece portion 18.

This finder shutter 46 is a liquid crystal shutter and can open and close in units of pixels that are arrayed vertically and horizontally, but may be a so-called mechanical shutter. In the case of a mechanical shutter, there is a structure in which a light blocking film gradually appears and disappears from one of the four sides of the image that can be seen from the eyepiece portion 18.

Namely, as shown in FIG. 2, at the interior of the digital camera 10, a optical path 48 of the image of the photographic subject that is incident optically via the objective lens 20 (the OVF image), and a optical path 50 of the image that is displayed on the EVF LCD 44 that serves as a display portion (the EVF image) are made to coincide (be coaxial) by a half-mirror 52 at the near side of the eyepiece portion 18. Therefore, in a case in which the finder is an HFV that serves as both an OVF and an EVF, when the user looks into the eyepiece portion 18, the user can see both the OVF image and the EVF image. Note that, in the present embodiment, as a default setting, the display of the EVF LCD 44 is off, and only an OVF image is captured.

Further, at the digital camera 10 relating to the present embodiment, an LCD having a light-emitting-diode-type backlight (hereinafter called "LED-type backlight") is used as the EVF LCD 44, and an LCD having a photoelectric-tube-type backlight is used as the aforementioned rear surface LCD 22. However, the present invention is not limited to this.

The structure of mainly the photographing processing control system in the digital camera 10 relating to the present embodiment is described next with reference to FIG. 3.

The digital camera 10 is structured to include the lens barrel 12 that is structured to include the above-described lens 12L and that moves in the optical axis direction by the lens barrel driver 34, the CCD 30 that is disposed at the rear side, in the optical axis direction, of the lens barrel 12, an analog signal processing section 54 that is structured to include a correlated double sampling circuit (hereinafter called "CDS"), an analog/digital converter (hereinafter called "ADC") 56 that converts inputted analog signals into digital data, and a digital signal processing section 60 that incorporates therein a line buffer of a predetermined capacity, and carries out control to directly store inputted digital image data in a predetermined region of a memory 58 that is described later, and carries out various types of image processings on digital image data.

Here, the correlated double sampling processing by the CDS of the analog signal processing section 54 is processing that, for the purpose of reducing noise (heat noise in particular) and the like that is included in the output signals of the solid-state image pickup element, obtains correct image data by determining the difference between the feed-through component level and the image signal component level that are included in the output signal per one pixel of the solid-state image pickup element.

On the other hand, the digital camera 10 is structured to include the LCD I/F 36 that generates signals for displaying, on the rear surface LCD 22, the image expressed by digital image data and menu screens and the like, and supplies the signals to the rear surface LCD 22, the LCD I/F 42 that generates signals for displaying, on the EVF LCD 44, the image expressed by digital image data and menu screens and the like, and supplies the signals to the EVF LCD 44, a CPU (Central Processing Unit) 66 that governs the operations of the digital camera 10 overall, the memory 58 that is structured by a VRAM (Video RAM) and mainly stores digital image data obtained by image capturing, the external memory I/F 38 that is for enabling the digital camera 10 to access a memory card 40 that is structured by a Smart Media (registered trademark), and a compression/decompression processing circuit 68 that carries out compression processing on digital image data by a predetermined compression format, and, on the other hand, carries out decompression processing, that corresponds to the compression format, on digital image data that was subjected to compression processing.

Further, a face detecting section 74, that detects the position of the photographic subject (the face of a person in the present embodiment) on the basis of the digital image data that was subjected to image processing by the digital signal processing section 60, and a distance measuring section 76, that measures the distance from the lens 12L to the photographic subject, are provided at the digital camera 10.

Note that the face detection of the face detecting section is carried out by using a known method. For example, a range of color difference signals (chroma signals) that are described later and that correspond to skin colors of persons, is determined in advance. The absence/presence of a skin-colored region is judged by judging whether or not the color difference signal of each pixel of the picked-up image information is within this range. If the proportion of a region having a skin color, with respect to the photographic subject shown by the picked-up image information, is greater than or equal to a predetermined magnitude, that region having a skin color is extracted as a skin-colored region. Next, it is judged whether or not patterns that are not skin-colored, such as eyes, a nose, a mouth, eyebrows, and the like, are included within predetermined positional ranges within the extracted skin-colored region. If these patterns are included, it is judged that this skin-colored region is the region of a face. Further, a method in which a cluster is determined from a two-dimensional histogram of the hue and saturation, and a face is judged from the internal structure, the shape and the connecting external structures of the cluster, or the like, may be utilized.

The memory 58, the digital signal processing section 60, the LCD I/Fs 36, 42, the CPU 66, the external memory I/F 38, the compression/decompression processing circuit 68, the face detecting section 74, and the distance measuring section 76 are connected to one another via a system bus 70. Accordingly, the CPU 66 can carry out control of the operations of the digital signal processing section 60, the compression/decompression processing circuit 68, the face detecting section 74 and the distance measuring section 76, and display of various types of information with respect to the rear surface LCD 22 and the EVF LCD 44, and accessing of the memory 58 and the memory card 40.

On the other hand, a timing generator 72, that generates timing signals mainly for driving the CCD 30 and supplies the timing signals to the CCD 30, is provided at the digital camera 10. The driving of the CCD 30 is controlled by the CPU 66 via the timing generator 72.

The CPU 66 carries out focus control such that the contrast value of the image obtained by image pickup by the CCD 30 becomes a maximum (the TTL (Through The Lens) method).

Figure 3:
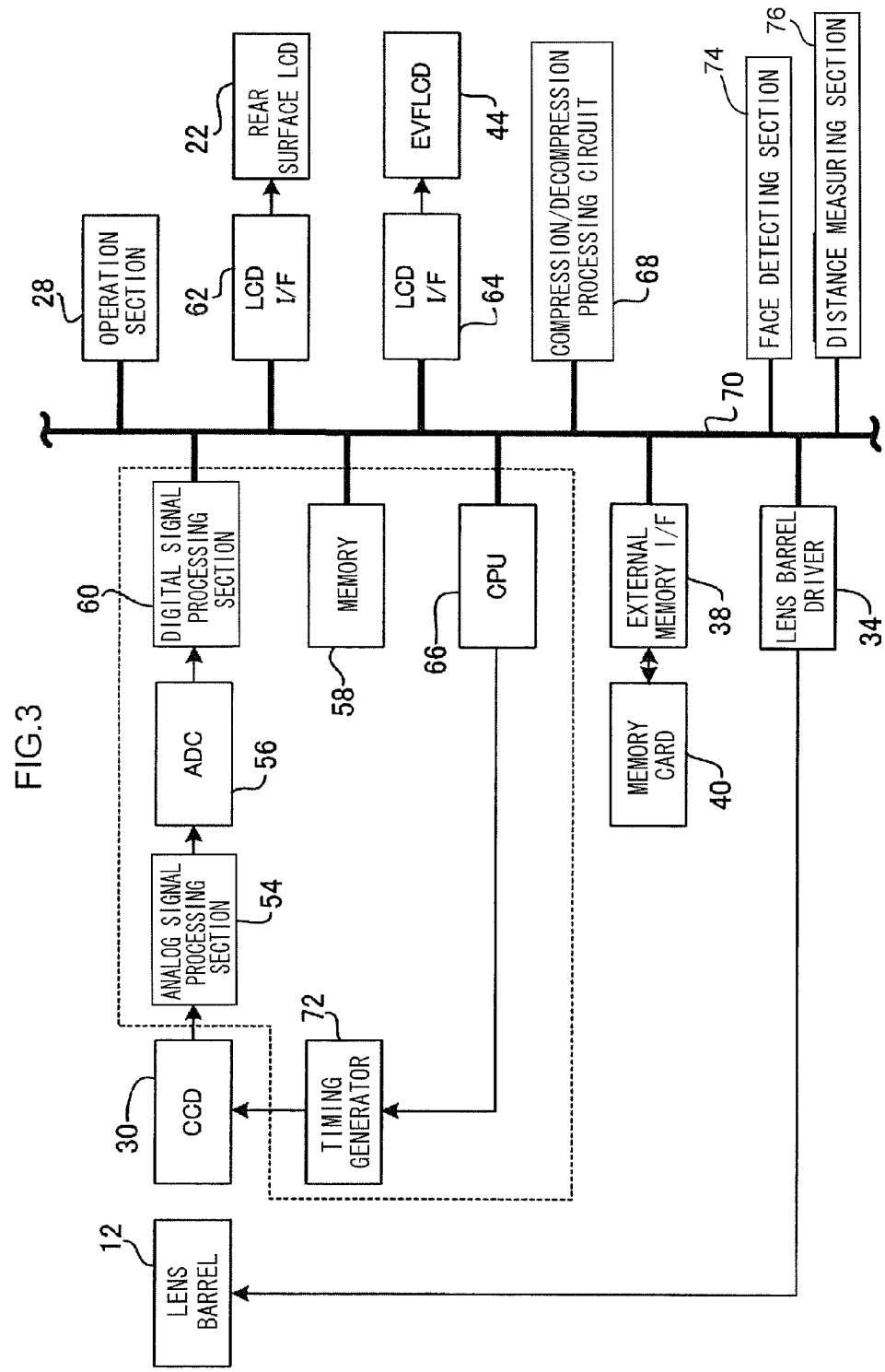
FIG. 3 is a control block diagram whose main subject is an image pickup control system at the digital camera relating to the present embodiment.

Note that the respective structural elements that are surrounded by the dashed line in FIG. 3 are the structural elements that structure the main controller 32. By the way, although not illustrated here, a diaphragm mechanism, that is such that the diaphragm diameter can be adjusted by the main controller 32, is provided with respect to the lens 12L at the digital camera 10. The exposure, that is one of the photographing conditions, is adjusted by the diaphragm mechanism or the shutter speed of the above-described CCD 30. Further, in a case in which the diaphragm and the depth of field are adjusted as photographing conditions, the diaphragm mechanism is adjusted. Further, in a case in which the white balance is adjusted, the digital signal processing section 60 that carries out image processings is controlled. In order for photographing, that reflects the set photographing conditions, to be carried out, the main controller 32 controls the diaphragm mechanism or the shutter speed of the CCD, the gain for the white balance adjustment, and the like in accordance with these settings. Note that the photographing conditions of the digital camera 10 are stored in a predetermined storage (e.g., the memory 58 or the like), and are used in the above-described various types of control. When the photographing conditions are changed, these stored photographing conditions are changed.

Operation of the present embodiment is described hereinafter.

(Usual Image Pickup/Playback Operations)

In a case in which the digital camera 10 is switched to an photography mode, signals, that express the photographic subject and that are outputted from the CCD 30 by image pickup via the lens 12L within the lens barrel 12, are successively inputted to the analog signal processing section 54. After analog signal processing, such as correlated double sampling processing or the like, is carried out thereon, the signals are inputted to the ADC 56. The ADC 56 converts the R (red), G (green), B (blue) signals that are inputted from the analog signal processing section 54 into R, G, B signals of 8 to 12 bits respectively (digital image data), and outputs the digital image data to the digital signal processing section 60.

The digital signal processing section 60 accumulates, in the line buffer, the digital image data that is successively inputted from the ADC 56, and temporarily stores the digital image data in a predetermined region of the memory 58.

The digital image data, that is stored in the predetermined region of the memory 58, is read-out by the digital signal processing section 60 under control by the CPU 66, and white balance adjustment is carried out by multiplying the digital image data by a digital gain corresponding to a predetermined physical amount, and gamma correction and sharpness correction are carried out, and 8-bit digital image data is generated. Moreover, YC signal processing is carried out such that luminance signals Y and chroma signals Cr, Cb (hereinafter called "YC signals") are generated, and the YC signals are stored in a region, that is different than the aforementioned predetermined region, of the memory 58.

Note that the rear surface LCD 22 relating to the present embodiment is structured as a display that displays video images (through-the-lens images, or also called through-the-lens pictures) that are obtained by continuous image pickup by the CCD 30, and can be used as a finder. When the rear surface LCD 22 is used as a finder in this way, the generated YC signals (video signals) are successively outputted to the rear surface LCD 22 via the LCD I/F 62. Due thereto, through-the-lens images are displayed on the rear surface LCD 22. The same holds for the EVF LCD 44 as well.

Here, when the release button 14 is set in the halfway-depressed state (S1) by the user, as described above, the AE function works and the exposure state is set, and thereafter, the AF function works and the focus is controlled. When, in continuation thereafter, the release button 14 is set in the fully depressed state (S2), the YC signals that are stored in the memory 58 at that point in time are compressed in a predetermined compression format (JPEG format in the present embodiment) by the compression/decompression processing circuit 68, and thereafter, are recorded on the memory card 40 via the external memory I/F 38, and photographing is thereby carried out.

On the other hand, the image data that is stored in the memory card 40 (or the memory 66) can be displayed on the rear surface LCD 22 (or the EVF LCD 44). Namely, when the digital camera 11 is switched from the photography mode to the playback mode, the rear surface LCD 22 (the EVF LCD 44) reads-out and displays image data that has already been stored in the memory card 40 (or the memory 66), and not through-the-lens images such as described above. In this display, trimmed images of two or more images, or of one image, can be displayed by operation of the operation section 28, with the displaying of one image on the display region of the rear surface LCD 22 (the EVF LCD 44) being a reference.

(Switching of Display Mode of Finder)

In the digital camera 10 relating to the present embodiment, when an OVF image is to be displayed at the eyepiece portion 18 (called the OVF display mode), the main controller 32 controls the finder shutter 46 and sets it in an open state, and makes it such that the optical path 48 of the objective lens 20 is not light-blocked. Further, the main controller 32 sets the EVF LCD 44 in an off state, and effects control such that an EVF image is not displayed at the eyepiece portion 18.

Further, when an EVF image is to be displayed at the eyepiece portion 18 (called the EVF display mode), the main controller 32 controls the finder shutter 46 and sets it in a closed state, and light-blocks the optical path 48 of the objective lens 20. Further, the main controller 32 sets the EVF LCD 44 in an on state, and effects control such that an EVF image is displayed at the eyepiece portion 18.

Further, when an OVF image and an EVF image are to be displayed simultaneously at the eyepiece portion 18, i.e., are to be displayed in a superposed manner (called the HVF display mode), the main controller 32 controls the finder shutter 46 and sets it in an open state, and makes it such that the optical path 48 of the objective lens 20 is not light-blocked, and sets the EVF LCD 44 in an on state, and effects control such that both an OVF image and an EVF image are displayed at the eyepiece portion 18 (i.e., a composite image in which the OVF image and the EVF image are merged is displayed).

(Changing of Photographing Settings)

The digital camera 10 relating to the present embodiment is equipped with a scene recognition function. The scene recognition function is a function that recognizes a photographed scene (e.g., a person, a scenery, a night view, a close-up, or the like) on the basis of the image signals and luminance values, and automatically changes the photographing settings in accordance with the recognized scene. Note that it is also possible for the user to manually set the photographed scene. Note that, both in cases in which the photographed scene is automatically recognized and in cases in which the photographed scene is set manually, the settings (including at least one of the exposure, WB or diaphragm) of the photographing conditions are changed in accordance with the photographed scene, and therefore, there are also cases in which the exposure, the WB or the diaphragm are changed drastically. Still further, the user himself can also adjust the exposure or the white balance (WB) or the diaphragm individually. Due thereto, the user can freely set the exposure or WB, diaphragm or the like within settable ranges. Hereinafter, there are also cases in which the setting of the photographing conditions is simply called photographing setting.

This scene recognition is carried out by the main controller 32.

Note that, when the photographing settings such as the exposure or the WB or the like are changed, digital image data, that has been subjected by the digital signal processing section 60 to image processings that correspond to the changes in the photographing settings, is generated, and therefore, the EVF image that is displayed reflects the photographing effects. Accordingly, when an EVF image is being displayed at the eyepiece portion 18, the user can grasp the photographing effects of the time when the photographing settings are changed. Further, also when the rear surface LCD 22 is used as a finder, in the same way, an EVF image that reflects the changes in these photographing settings is displayed. On the other hand, changes in the photographing settings are not reflected in an OVF image. Therefore, in the state in which only an OVF image is displayed at the eyepiece portion 18, when the photographing settings such as the setting of the exposure, the setting of the white balance (WB), the setting of the diaphragm (depth of field) or the like are changed, the user cannot grasp the effects of the change in settings (the effects are not reflected in the image). In order to confirm these effects during the OVF display mode, in conventional techniques, switching is needed such as the mode is switched to the EVF display mode, or an EVF image is displayed on the rear surface LCD 22 or the like. However, in carrying out these switchings, a time lag up until the image capturing is generated, and the immediacy of operation in accordance with the OVF display mode deteriorates.

(Display Switching Control Processing)

Figure 4A:
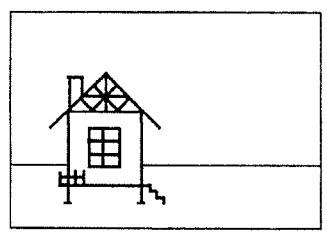
FIG. 4A is a drawing illustrating an OVF image.
Figure 4B:
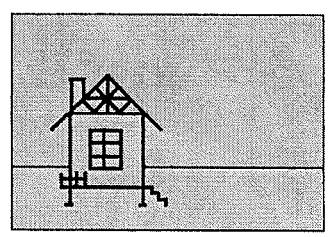
FIG. 4B is a drawing illustrating an EVF image.

Thus, in the present embodiment, when the photographing settings are changed during the OVF display mode, the mode is switched to the HVF display mode up until a predetermined time elapses from the change in setting, and the eyepiece portion 18 is made to display a composite image (also called an HVF image, refer to FIG. 4C as well) in which an EVF image (refer to FIG. 4B as well), that has been subjected to image processings in accordance with this change in setting, is superposed on an OVF image (refer to FIG. 4A as well).

Figure 5:
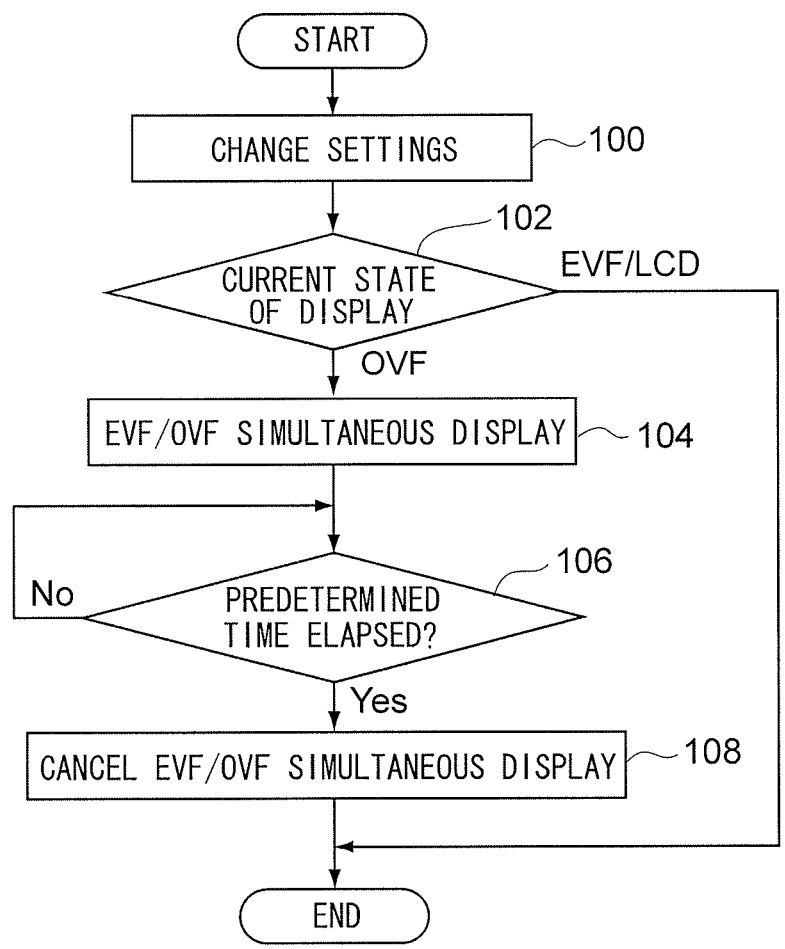
FIG. 5 is a flowchart illustrating an example of the flow of display switching control processing of a finder.

FIG. 5 is a flowchart illustrating an example of the flow of display switching control processing. Note that the program of the display switching control processing is stored in an unillustrated storage as one of the programs that is executed by the CPU 66 of the main controller 32.

In step 100, changing of the photographing settings is carried out. Note that the photographing settings include at least one of the setting of the exposure, the setting of the WB, and the setting of the diaphragm (depth of field).

In step 102, the current state of display is judged. If the current state of display is the OVF display mode, the routine moves on to step 104.

Figure 4C:
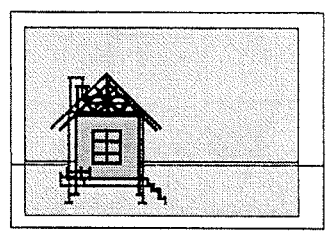
FIG. 4C is a drawing illustrating a state in which the OVF image and the EVF image are superposed.

In step 104, the mode is switched to the mode that carries out EVF/OVF simultaneous display, i.e., the HVF display mode. Due thereto, as shown in FIG. 4C, a composite image, in which the OVF image and the EVF image that reflects the changed contents of the aforementioned photographing settings are superposed, is displayed at the eyepiece portion 18.

In step 106, it is judged whether or not a predetermined time has elapsed from the switching to the HVF display mode. The HVF display mode is continued until the predetermined time elapses. When the predetermined time elapses, the routine moves on to step 108 where the mode that carries out EVF/OVF simultaneous display, i.e., the HVF display mode, is cancelled, and the mode is switched to the OVF display mode. Due thereto, the display state of the eyepiece portion 18 becomes a state in which only the OVF image is displayed as shown in FIG. 4A.

On the other hand, in step 102, in a case in which the current state of display is the EVF display mode, or in a case in which an EVF image is displayed on the rear surface LCD 22, the display switching control processing is ended without carrying out step 104 through step 108.

In this way, in the present embodiment, when the photographing settings are changed, an HVF image is displayed automatically for a uniform time, and thereafter, control that turns the HFV display off (returns to the OVF display) is carried out. Due thereto, even in cases in which a change in the photographing settings is carried out at the time of using the OVF, the photographing effects can be provided to the user in real time without deteriorating the feeling of use (the immediacy) of the OVF.

Note that there may be a structure in which the mode can be returned to the OVF display mode before the predetermined time elapses, due to the user operating the operation section 28 during this HVF display mode. Further, in a case in which, after switching to the OVF display mode, at least one of the set value of the exposure, the set value of the WB and the set value of the diaphragm is changed, by greater than or equal to a predetermined threshold value, from the value at the time of that switching, the mode may be switched to the HVF display mode in step 104.

Figure 6A:
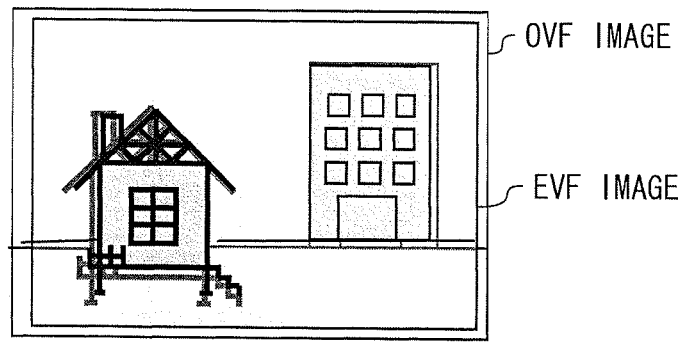
FIG. 6A is a drawing illustrating a state in which an EVF image is superposed on an entire OVF image.

By the way, merely by simply superposing the EVF image on the OVF image, a double image is formed by the OVF image and the EVF image. Therefore, there are also cases in which the photographing setting effects such as exposure or the like can be confirmed, but there becomes a state in which the viewability is poor (refer to FIG. 6A as well).

Figure 6B:
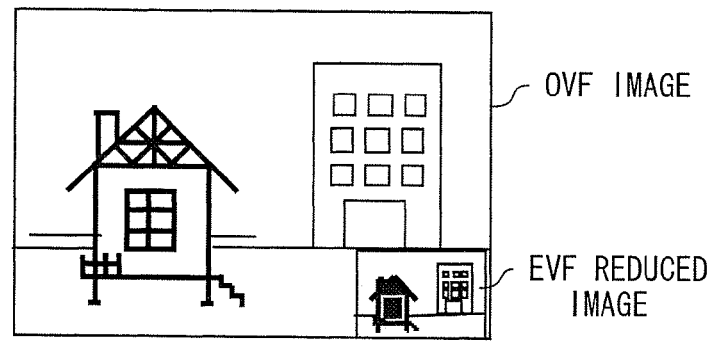
FIG. 6B is a drawing illustrating a state (EVF reduced display) in which the EVF image is reduced and is placed and displayed at an end portion of the OVF image.

Thus, without superposing the entire EVF image on the entire OVF image, the EVF image may be reduced, and this reduced image may be placed at the edge of the OVF image, as shown in FIG. 6B. Due thereto, the photographing setting state can be presented to the user in real time without offending the eyes that are viewing the OVF image. Hereinafter, the method of displaying, in a superposed manner, the reduced image of the EVF image in this way in the HVF display mode is called EVF reduced display.

Note that there are also cases in which the photographing settings are changed and photographing is carried out by using, as is, the results of recognition of the time when a photographed scene is automatically recognized by the scene recognition function, without relying on the user settings. However, in the case in which the user can operationally input whether he has finally authorized and set (finalized) these recognition results or has cancelled the recognition results, the scene recognition can continue until the user finalizes the recognition results of the photographed scene.

Figure 6C:
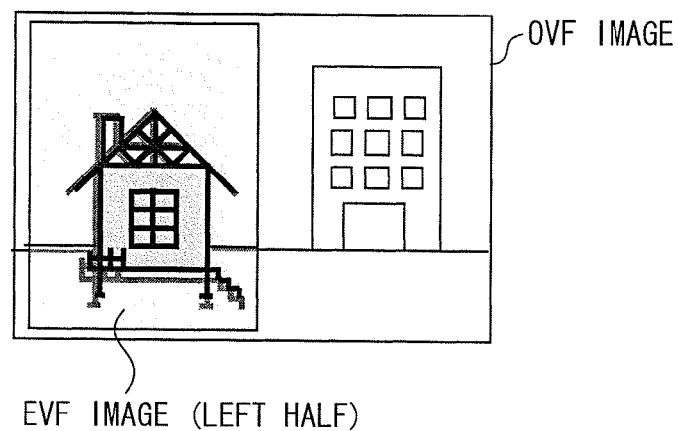
FIG. 6C is a drawing illustrating a state (EVF half-screen display) in which the EVF image that is not reduced is displayed in an superposed manner on half of the OVF image.

In the course of changing such photographing settings, during the time period in which the recognition results of the photographed scene are not finalized, as shown in FIG. 6B, the reduced image of the EVF image may be displayed in a superposed manner on the OVF image, and when the recognition results of the photographed scene are finalized, as shown in FIG. 6C, the left-half or right-half region of the OVF image may be made to be a superposition region, and an image portion corresponding to this superposition region from the EVF image may be displayed in a superposed manner in this superposition region without being reduced. Hereinafter, a display method that superposes half of the EVF image on half of the OVF image in this way in the HVF display mode is called EVF half-screen display. Here, in FIG. 6C, the EVF image is superposed in the left half of the OVF image. However, as described above, the superposition region in which the EVF image is superposed may be the right half of the OVF image. Further, this superposition region may be the upper half, or may be the lower half.

Note that it may be made such that EVF half-screen display is carried out even in the stage before the finalizing. Due thereto, the user can be notified even of the images of the fine portions that cannot be confirmed merely by the EVF image that is reduced in the EVF reduced display, and photographing while comparing the OVF image and the EVF image can be carried out. Description is given hereinafter with reference to FIG. 7.

FIG. 7 is a flowchart illustrating an example of the flow of display switching control processing at the time when the scene recognition function is executed. Note that, hereinafter, the results of scene recognition appearing due to the scene recognition function is called "scene finalization", so as to distinguish from "finalization" in which the user authorizes the recognition results and the photographed scene is set.

In step 200, scene recognition by the scene recognition function is started. Changing of the photographing settings is carried out is accordance with the recognition results by the scene recognition function.

In step 202, the current state of display is judged. If the current state of display is the OVF display mode, the routine moves on to step 204.

In step 204, the mode is switched to the mode that carries out EVF/OVF simultaneous display, i.e., the HVF display mode. Note that, at this time, reduction processing is carried out on the digital image data that expresses the EVF image, and a reduced image, in which the EVF image is reduced, is displayed in a superposed manner at an end portion of the OVF image, and there is made to be a state of EVF reduced display.

Note that the scene recognition operation is continued (steps 206, 208) until scene finalization. In step 208, after scene finalization, the photographing conditions are changed to photographing conditions that correspond to the photographed scene that has been scene-finalized, and an EVF image that reflects the effects of this change is displayed.

Next, in step 210, it is judged whether or not the user has inputted a setting change via the operation section 28 (the user has cancelled without finalizing the recognition results, and an instruction to carry out scene recognition again has been inputted). Here, if it is judged that a setting change has been inputted, the routine proceeds to step 212 where the setting change is carried out (i.e., the recognition results are cancelled), and the routine returns to step 206 where scene recognition is carried out again. Note that the EVF reduced display is continued until the recognition results are finalized by the user.

On the other hand, in step 210, if a setting change has not been inputted, i.e., if the user has finalized the recognition results by the scene recognition function, the routine moves on to step 216.

In step 214, display is switched from EVF reduced display to EVF half-screen display.

In step 216, it is judged whether or not S1 is in an ON state. If the judgment in step 216 is negative, the routine proceeds to step 218.2

In step 218, it is judged whether or not a predetermined time has elapsed from the start of the EVF half-screen display. The HVF display mode of the EVF half-screen display is continued until the predetermined time elapses. When the predetermined time elapses, the routine moves on to step 220 where the HVF display mode of the EVF half-screen display is cancelled and the mode is switched to the OVF display mode.

On the other hand, if the judgment in step 216 is affirmative, the routine skips step 218 and proceeds to step 220 where the HVF display mode of the EVF half-screen display is cancelled and the mode is switched to the OVF display mode.

Further, in step 204, in a case in which the current state of display is the EVF display mode, or in a case in which an EVF image is displayed on the rear surface LCD 22, the routine proceeds to step 222, i.e., usual processing that effects control such that the EVF image is displayed at the eyepiece portion 18 or the rear surface LCD 22 is carried out.

In this way, in the usual state until the scene recognition results are finalized, EVF reduced display is carried out, and, after the scene recognition results are finalized, display is switched to the EVF half-screen display, and cancellation of the EVF half-screen display due to S1 being turned on, or cancellation after a uniform time elapses, is carried out. Due thereto, the user can confirm the settings at the time of photographing without taking his eyes off of the OVF image and carrying out switching to the EVF display mode, and the providing of scene recognition that is suited to the HVF, and rapid photographing, are possible.

Note that, here, description is given of an example in which, during the time period in which the results of recognizing the photographed scene are not finalized, EVF reduced display is carried out, and, at the time when the photographed scene is finalized, the display is switched to the EVF half-screen display. However, the present invention is not limited to this.

For example, in a case in which the photographing settings are not changed by the scene recognition function and the photographing settings are changed directly by the user himself operating the operation section 28, for example, during the time period when the value of the exposure or the like is being changed (i.e., in the stage before the photographing settings are finalized), EVF reduced display may be carried out, and, when the photographing settings such as exposure, WB or the like are finalized by the user depressing the OK button or the like of the operation section 28, the display may be switched to the EVF half-screen display.

Further, display by the EVF half-screen display may be carried out always at the time of carrying out a change in the photographing settings, regardless of the finalizing of the photographed scene or the like. Further, description has been given of an example in which the EVF half-screen display is cancelled and the mode is switched to the OVF display mode due to S1 being set in an ON state. However, the EVF half-screen display may be cancelled and the mode may be switched to the OVF display mode by operation of a switch or a button other than the release button 14 of the operation section 28.

As described above, by placing the EVF image partially on the OVF image, worsening of the overall viewability due to the superposing of the OVF image and the EVF image is kept to the minimum, and the photographing effects such as scene recognition, exposure, WB and the like can be confirmed while the immediacy of the OVF is maintained as is.

By the way, in the HVF display mode in which an EVF image and an OVF image are simultaneously displayed transmissively, in addition to the above-described problem of a double image, there are cases in which the correct WB and exposure are difficult to judge in an environment that is too bright or an environment that is too dark. Concretely, as shown in the bottom row of FIG. 8, in a case in which the luminance of an OVF image that corresponds to the brightness of the environment is a medium luminance, the EVF image is not too weak (the luminance is not too low) with respect to exterior light (the OVF image) and is easy to view. Therefore, the effects of photographing settings in accordance with the HVF display mode are easy to understand. However, as shown in the upper row of FIG. 8, for example, in a case in which the brightness of the environment is too bright (the luminance of the OVF image is too high), there are cases in which the EVF image is too weak (the luminance is too low) with respect to the exterior light and it is difficult to understand the effects of the photographing settings. Further, the same holds also in cases in which the environment is too dark (the luminance is too low).

Thus, in order to improve the difficulty of viewing due to such an environment, display may be carried out with the luminance of the EVF image adjusted such that the viewability improves. Concretely, for example, the recognition results due to the scene recognition function are usually results that correspond to the brightness of the environment. Therefore, a value of the luminance of the EVF image at which the viewability improves may be registered in advance in the digital camera 10 per photographed scene, and the luminance of the EVF image may be changed in accordance with the scene recognition results. Description is given hereinafter with reference to FIG. 9.

Figure 9:
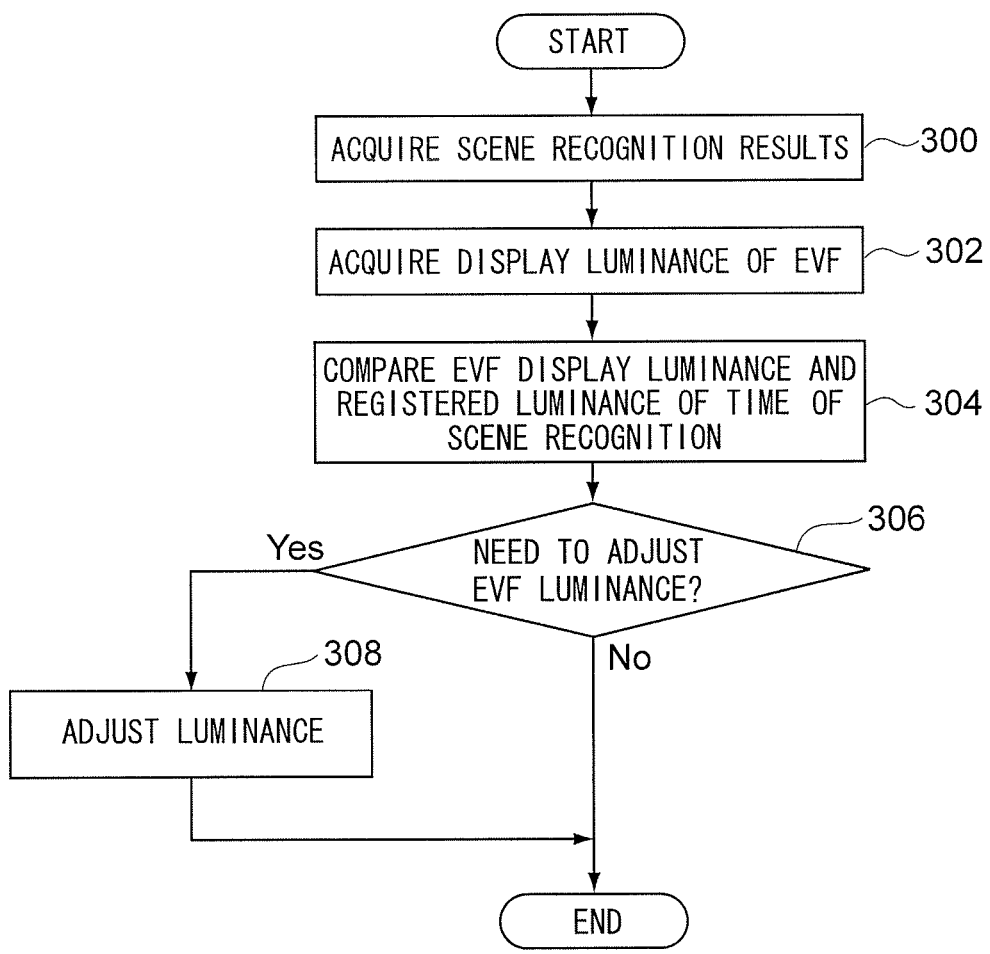
FIG. 9 is a flowchart illustrating an example of the flow of display control processing that adjusts the luminance of an EVF image and controls the display.

FIG. 9 is a flowchart illustrating an example of the flow of display control processing that adjusts the luminance of the EVF image and controls the display. Note that a target luminance of the EVF image is stored (registered) in advance per photographed scene in a storage (not illustrated here) of the digital camera 10 per photographed scene. Hereinafter, the target luminance of the EVF image is called the registered luminance.

In step 300, the scene recognition results by the scene recognition function are acquired. In step 302, the display luminance of the EVF image is acquired.

In step 304, the aforementioned display luminance of the EVF image that was acquired, and the registered luminance that was stored in advance as the target luminance of an EVF image in a photographed scene that is expressed by the scene recognition results (hereinafter called registered luminance of the time of scene recognition), are compared.

In step 306, on the basis of the results of comparison of step 304, it is judged whether or not there is the need to adjust the luminance of the EVF image. For example, in a case in which the difference between the display luminance of the EVF image and the registered luminance of the time of scene recognition exceeds a predetermined threshold value, it may be judged that there is the need to adjust the luminance of the EVF image, and, if this difference is less than or equal to the threshold value, it may be judged that there is no need to adjust the luminance of the EVF image. When it is judged in step 306 that there is the need to adjust the luminance of the EVF image, in step 308, the digital signal processing section 60 is controlled, and image processing is executed such that the luminance of the EVF image becomes the registered luminance, and the luminance of the EVF image is adjusted.

Then, in the HVF display mode, control is carried out such that this adjusted EVF image is displayed (refer to step 104 of FIG. 5, and also step 204, step 214 of FIG. 7).

Note that, here, the luminance of the EVF image is adjusted in accordance with the photographed scene that the scene recognition results express. However, instead of the scene recognition results, the brightness of the environment may be acquired, and the luminance of the EVF image may be adjusted such that the viewability of the EVF image improves in accordance with the brightness of the environment.

Further, here, the luminance of the EVF image is adjusted. However, an ND filter that limits the light amount may be provided movably between the objective lens 20 and the finder shutter 46, and the luminance of the OVF image may be adjusted by this ND filter.

Figure 10:
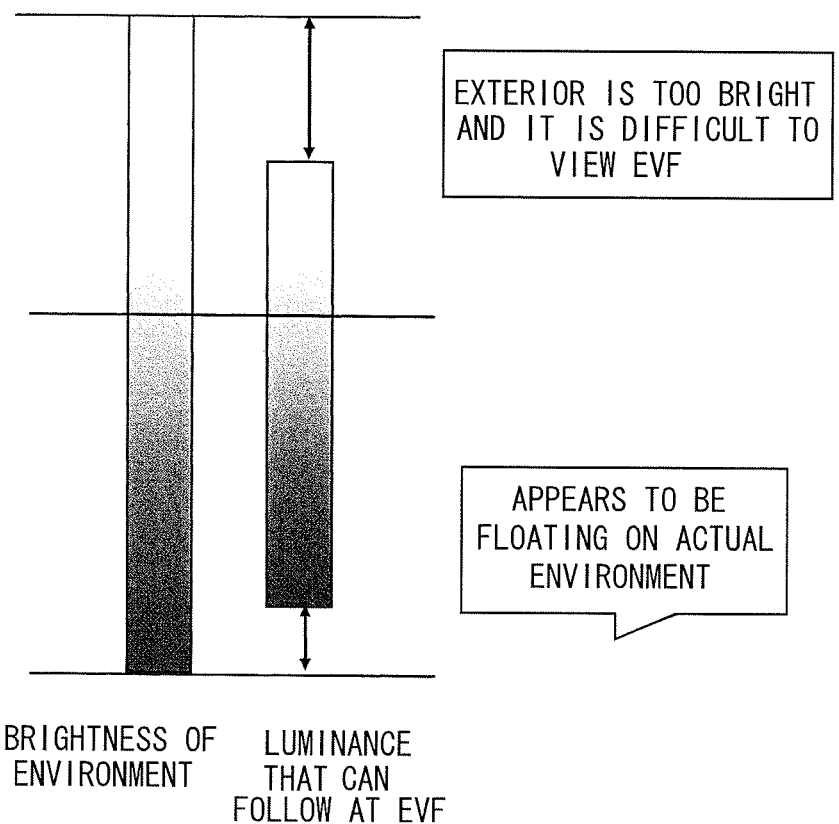
FIG. 10 is a drawing illustrating the relationship between a range of variation in brightness of the environment, and an adjustable range of luminance of an EVF image.

As described above, by adjusting the luminance of the EVF image, an improvement in the difficulty of seeing due to the environment can be devised. However, as shown in FIG. 10, the range of fluctuations in the brightness of the environment is wider than the range in which the luminance of an EVF image can be adjusted. Therefore, if the difference between the luminance of the EVF image and the exterior light (the brightness of the environment) becomes large to a certain extent, there are cases in which it cannot be improved merely by adjusting the luminance.

Thus, in such a case, by carrying out not only luminance adjustment of the EVF image but also physical control to close the portion, that corresponds to the display range of the EVF image, at the finder shutter 46, the exterior light (OVF image) that becomes the base of the EVF image may be blocked, and the difficulty of seeing the EVF image may be improved. Description is given hereinafter with reference to FIG. 11.

Figure 11:
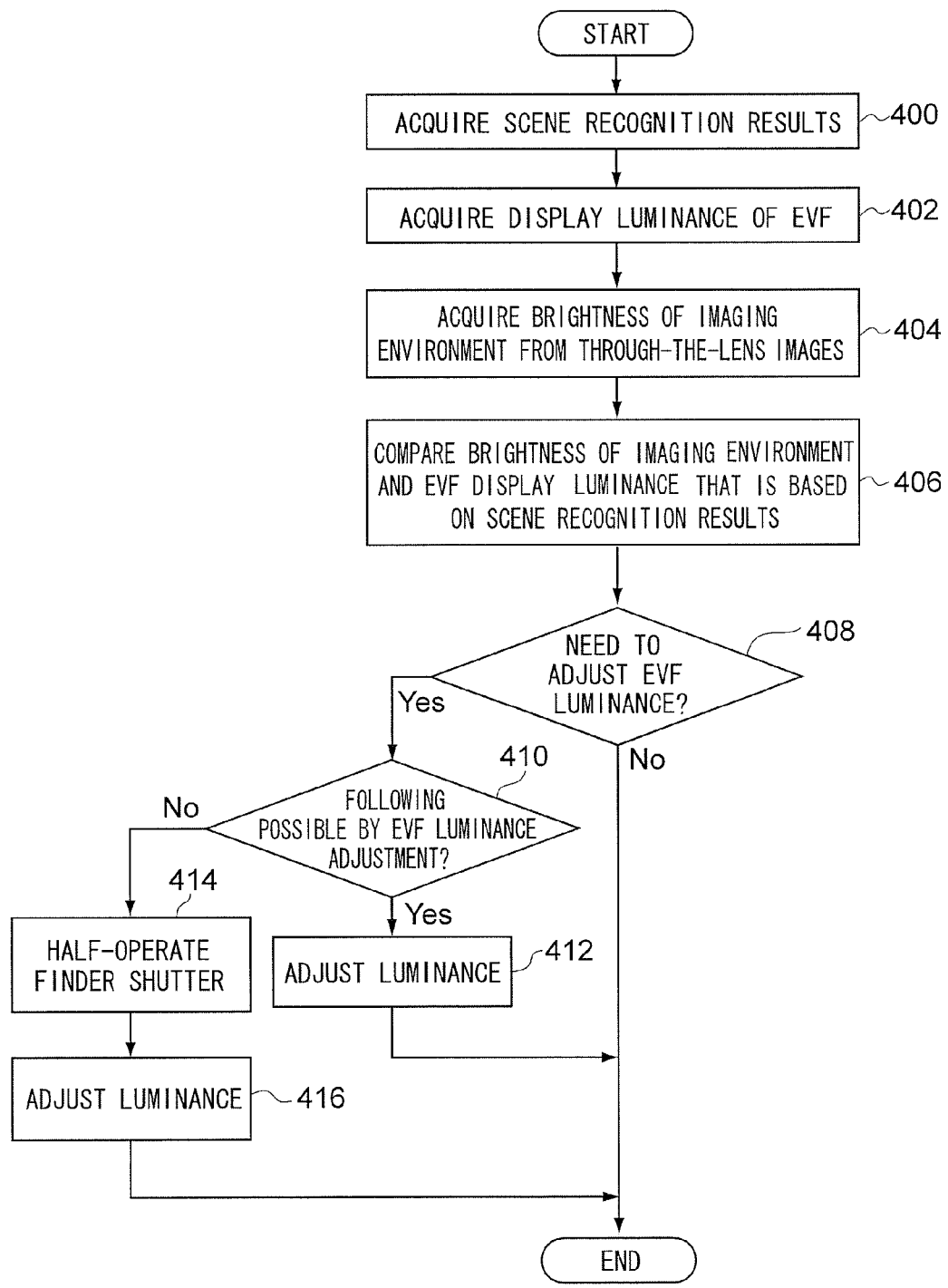
FIG. 11 is a flowchart illustrating an example of the flow of display control processing that adjusts brightness of the EVF image and controls opening/closing of a finder shutter.

FIG. 11 is a flowchart illustrating an example of the flow of display control processing that adjusts the luminance of the EVF image and controls the opening/closing of the finder shutter 46.

In step 400, the scene recognition results by the scene recognition function are acquired. In step 402, the display luminance of the EVF image (an image that reflects the photographing settings corresponding to the scene recognition results) is acquired.

In step 404, a value, that expresses the brightness of the photographing environment, is acquired from the through-the-lens images before they have been subjected to image processing corresponding to the photographing settings by the digital signal processing section 60. Note that, here, an example is given of a case of acquiring a value that expresses the brightness of the environment based on the through-the-lens images, but a photometric section that measures the light amount of the photographic subject may be provided separately at the digital camera 10, and the brightness of the environment may be detected and acquired from this light amount.

In step 406, the brightness of the photographing environment and the display luminance of the EVF image are compared. Note that, here, the luminance of the OVF image, that is determined in accordance with the brightness of the photographing environment, and the display luminance of the EVF image may be compared.

In step 408, on the basis of the results of comparison of step 406, it is judged whether or not there is the need to adjust the luminance of the EVF image. For example, in a case in which the difference between the luminance of the OVF image, that is determined in accordance with the brightness of the photographing environment, and the display luminance of the EVF image exceeds a predetermined threshold value, it may be judged that there is the need to adjust the luminance of the EVF image. In a case in which this difference is less than or equal to the threshold value, it may be judged that there is no need to adjust the luminance of the EVF image.

If it is judged in step 408 that there is no need to adjust the luminance of the EVF image, adjustment of the luminance of the EVF image and control of the finder shutter are not carried out.

On the other hand, if it is judged in step 408 that there is the need to adjust the luminance of the EVF image, in step 410, it is judged whether or not the brightness of the environment can be followed by adjusting the luminance of the EVF image. Here, this possibility of following means that it is possible to improve the viewability of the EVF image by luminance adjustment of the EVF image with respect to the brightness of the photographing environment.

If it is judged in step 410 that following is possible, the routine moves on to step 412. In step 412, the digital signal processing section 60 is controlled and image processing is executed such that the luminance of the EVF image becomes a luminance at which the viewability improves in accordance with the brightness of the photographing environment.

If it is judged in step 410 that following is not possible, control is carried out such that the finder shutter 46 is half-operated (at a liquid crystal shutter, the region corresponding to the portion that displays the EVF image is set in a closed state, and the remainder is set in an open state) and light is blocked at the portion of the OVF image at which portion the EVF image is disposed. The OVF image is no longer displayed at the portion that corresponds to this light-blocked region of the eyepiece portion 18.

In step 412, the digital signal processing section 60 is controlled such that the luminance of the EVF image is corrected as much as possible in the direction in which the viewability improves.

Figure 12:
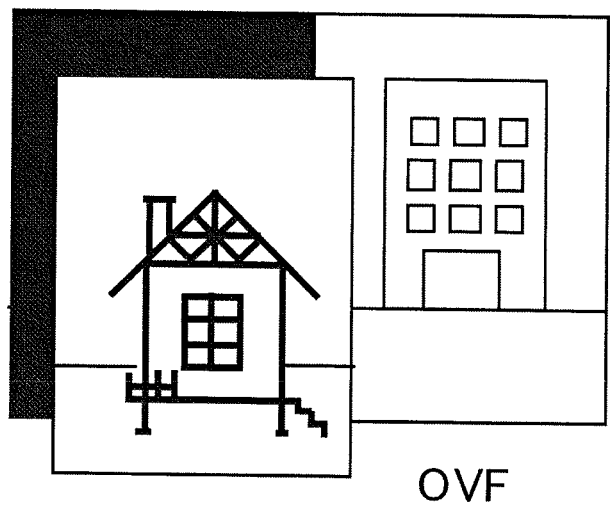
FIG. 12 is a drawing illustrating a state at the time of displaying the EVF image at a light-blocked region that is obtained by controlling the finder shutter.

Then, control is carried out such that this EVF image whose luminance has been corrected is displayed in the HVF display mode. Due thereto, as shown in FIG. 12, at the eyepiece portion 18, only the EVF image is displayed on the light-blocked region of the finder shutter 46, and therefore, the photographing effects can be judged without being affected by the OVF image.

As described above, by simultaneously carrying out EVF luminance control that corresponds to the photographing environment and finder shutter control, even if the EVF image and the OVF image are displayed simultaneously, correct judgment of the photographing effects is possible regardless of the brightness of the environment.

Note that, in FIG. 9 and FIG. 11, description is given of an example of carrying out EVF image luminance control (and driving control of the finder shutter 46) at the time of changing the photographing settings by using the scene recognition function. However, also in other cases in which the photographing settings are changed, such as when the photographing settings are changed manually or the like, luminance adjustment of the EVF image and driving control of the finder shutter 46 can be carried out, in the same way as described above.

Figure 13:
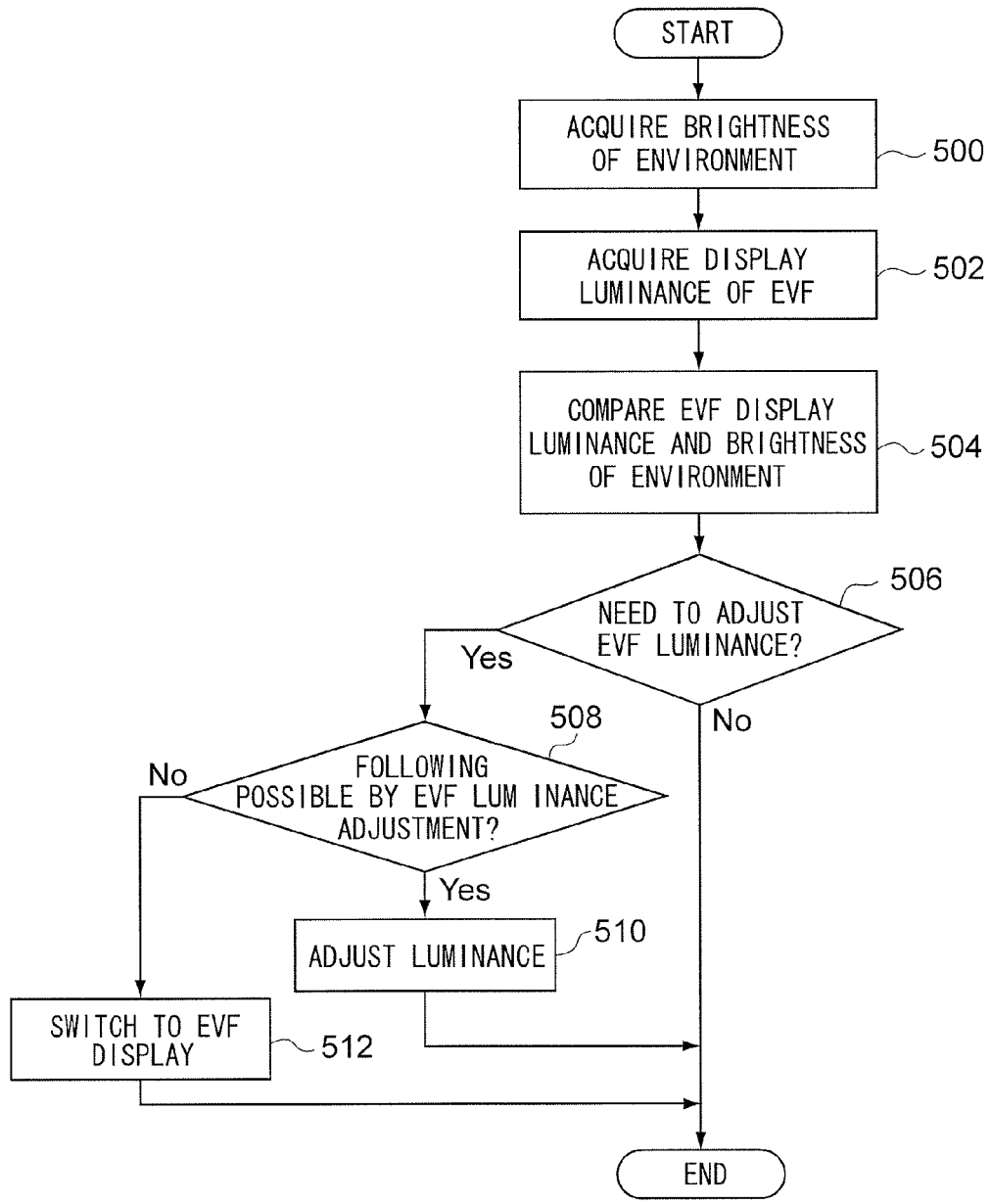
FIG. 13 is a flowchart illustrating an example of the flow of display control processing that includes processing in a case in which, even if the luminance of the EVF image is adjusted, the brightness of the environment cannot be followed.

As described above, even if correction of the luminance of the EVF image is carried out in accordance with the brightness of the environment, in an environment that is further too bright or too dark, there may be an environment in which following by correction becomes impossible due to mechanical limitations and the difference between the visual field of the OVF image and the EVF image becomes large, and it is difficult to confirm, in a simultaneous display, the effects of photographing settings. In such a situation, if the luminance of the EVF image, that corresponds to the photographing settings, and the brightness of the environment are compared, and it is judged that the viewability of the EVF image will not improve by luminance adjustment, the mode may be switched to the EVF display mode. Description is given hereinafter with reference to FIG. 13. Note that the processing shown in FIG. 13 is executed after the digital camera 10 is switched from the OVF display mode to the HVF display mode (refer to FIG. 5 and FIG. 7 as well).

In step 500, a value expressing the brightness of the photographing environment (the brightness of the environment) is acquired.

In step 502, the display luminance of the EVF image is acquired.

In step 504, in the same way as in above-described step 406, the brightness of the photographing environment and the display luminance of the EVF image are compared.

In step 506, in the same way as the processing of above-described step 408, on the basis of the results of comparison of step 504, it is judged whether or not there is the need to adjust the luminance of the EVF image.

If it is judged in step 506 that there is no need to adjust the luminance of the EVF image, luminance adjustment of the EVF image and switching of the display mode of the finder are not carried out.

On the other hand, if it is judged in step 506 that there is the need to adjust the luminance of the EVF image, in step 508, it is judged whether or not the brightness of the environment can be followed by adjusting the luminance of the EVF image. If it is judged in step 508 that following is possible, the routine proceeds to step 510. In step 510, the digital signal processing section 60 is controlled and image processing is executed such that the luminance of the EVF image becomes a luminance at which the viewability improves in accordance with the brightness of the photographing environment.

Further, if it is judged in step 508 that following is not possible, the mode is switched from the HVF display mode to the EVF display mode.

Note that, after switching to the EVF display mode, for example, when S1 is turned ON, or when a predetermined time elapses, the mode may be switched to the OVF display mode, or the EVF display mode may be continued as is.

As described above, in the simultaneous display of an OVF image and an EVF image (the HVF display mode), if the difference in luminances of the OVF image and the EVF image is great, the digital camera 10 judges this automatically from the photographing environment and changes display to the EVF display mode. Therefore, the user can correctly judge the effects of the photographing settings.

Here, description has been given by using, as an example, a case of switching to the EVF display mode, but the mode may be switched to the OVF display mode. Further, there may be provided a function that is such that which of the EVF display mode and the OVF display mode is to be prioritized is determined by selection of the user.

Figure 14:
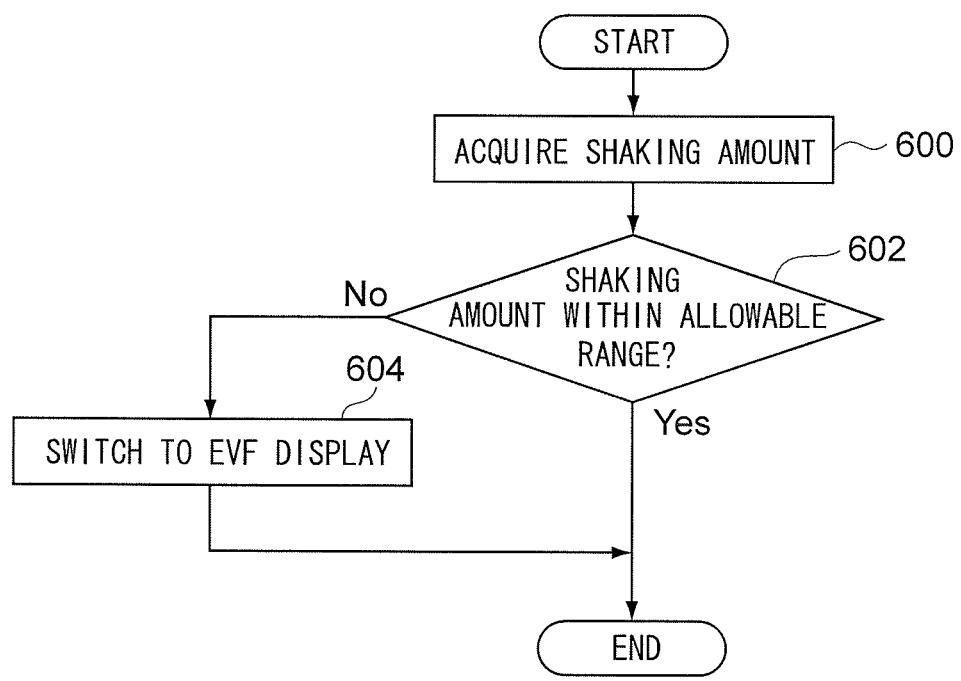
FIG. 14 is a flowchart illustrating an example of display control processing that switches to an EVF display mode when a shaking amount exceeds an allowable range.

By the way, there are cases in which the difference between the visual field of the EVF image and the OVF image becomes too large due to factors such as shaking of the camera or the like. Thus, the digital camera 10 may be structured such that, when the camera is set in the HVF display mode, camera shaking is detected, and if the detected camera shaking is great, the mode is automatically switched to the EVF display mode that displays an EVF image in which the camera shaking is corrected. In this case, a camera shaking detecting section that detects camera shaking is provided at the digital camera 10, but illustration thereof is omitted here. Here, detailed description is given with reference to FIG. 14. The processing of FIG. 14 is executed after the digital camera 10 is switched from the OVF display mode to the HVF display mode (refer to FIG. 5 and FIG. 7 as well).

In step 600, a shaking amount is acquired from the camera shaking detecting section.

In step 602, it is judged whether or not the acquired shaking amount is within a predetermined allowable range. If the judgment in step 602 is negative, in step 604, the mode is switched to the EVF display mode that displays an EVF image in which the camera shaking has been corrected. Further, if the judgment in step 602 is affirmative, the HVF display mode is continued.

Note that, in a case in which the display is switched, there is a state in which the camera is shaking. Therefore, after switching to the EVF display mode, even if S1 is in an ON state, the EVF display mode may be continued as is until photographing (until S2 is turned ON) without cancelling the EVF display mode.

As described above, camera shaking can be directly seen in an OVF image, but, by automatically switching to the EVF display mode, stable focusing can be carried out.

Figure 15A:
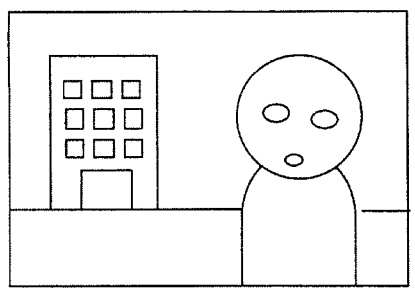
FIG. 15A is a drawing illustrating an OVF image.
Figure 15B:
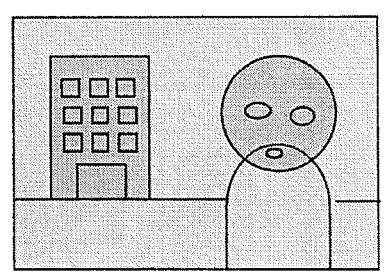
FIG. 15B is a drawing illustrating an EVF image.
Figure 15C:
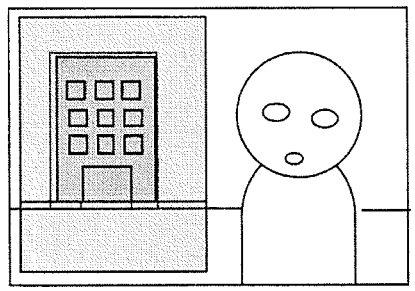
FIG. 15C is a drawing illustrating EVF half-screen display.
Figure 15D:
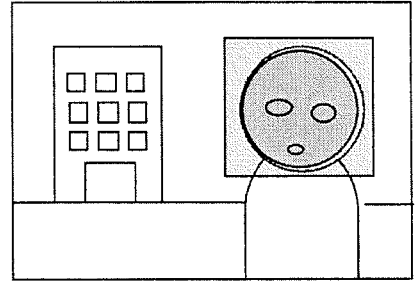
FIG. 15D is a drawing illustrating a state in which an EVF image is superposed on a region that includes a detected photographic subject (here, the face of a person)

Note that the above describes, as examples, the display in which the EVF image is superposed on the entire OVF image (refer to FIG. 6A as well) and the EVF half-screen display (refer to FIG. 6C as well) as concrete examples of cases in which the EVF image is superposed on the OVF image without being reduced. However, the present invention is not limited to this. For example, in cases in which face detection is carried out by the face detecting section 74 or object recognition is carried out by an unillustrated object recognizing section, it is predicted that, concretely, the face that is detected or the object that is recognized is probably the subject that the user wishes to capture. Accordingly, in this case, instead of superposing the EVF image on half of the OVF image (refer to FIG. 15C as well), the EVF image may be superposed (refer to FIG. 15D as well) on a region that includes the detected face or the recognized object (the portion of the photographic subject that the user will probably designate as the main photographic subject).

For example, in the example shown in FIG. 15, the face of a person exists at the right side of the image pickup region. Accordingly, the region that it is predicted that the user will wish to confirm the photographing effects of is not the region at the left side, and is the region at the right side and the region where the face of the person exists. Accordingly, rather than displaying the EVF image in a superposed manner on the left half where the person does not exist, by superposing the EVF image on the region where the face of the person exists, the photographing effects of the image at the place where the user wishes to know the photographing effects can be confirmed, and therefore, there becomes a display state that is more preferable for the user.

In this way, in a case in which a face is detected, by superposing the EVF image on the position of the detected face, the user can be made to grasp the photographing effects, such as the shade or the gradation or the like of the time of photographing, without carrying out switching from the OVF display mode to the EVF display mode. Note that the present invention is not limited to face detection. In a case in which a function that causes recognition of an object designated by the user is provided at the digital camera 10 as described above, it suffices for the EVF image to be superposed on a region that includes the recognized object, and due thereto as well, similar effects are obtained.

Figure 16A:
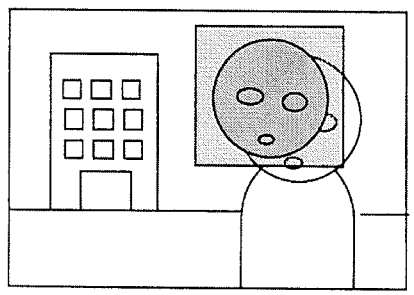
FIG. 16A is a drawing illustrating an HVF display state without parallax correction.

Note that, as described above, in a case in which the EVF image is superposed on a place that is recognized as a photographic subject, there is the possibility that, due to parallax, the EVF image will not be displayed at the correct position with respect to the OVF image as shown in FIG. 16A.

Here, parallax is a phenomenon that arises due to the objective lens 20 for the finder being provided separately from the lens 12L for photographing. An OVF image is an optical image that is expressed by light incident from the objective lens 20, and an EVF image is an electronic image that is obtained by light, that is incident from the lens 12L for photographing, being received by the image pickup element 30. Therefore, there are cases in which positional offset arises between the OVF image and the EVF image. Note that, the nearer the photographing (the closer the photographic subject), the greater the parallax (offset of the image of the photographic subject).

Thus, the parallax amount of the EVF image and the OVF image may be corrected on the basis of the photographic subject distance (the distance from the digital camera to the photographic subject) at the time of face detection.

Figure 17:
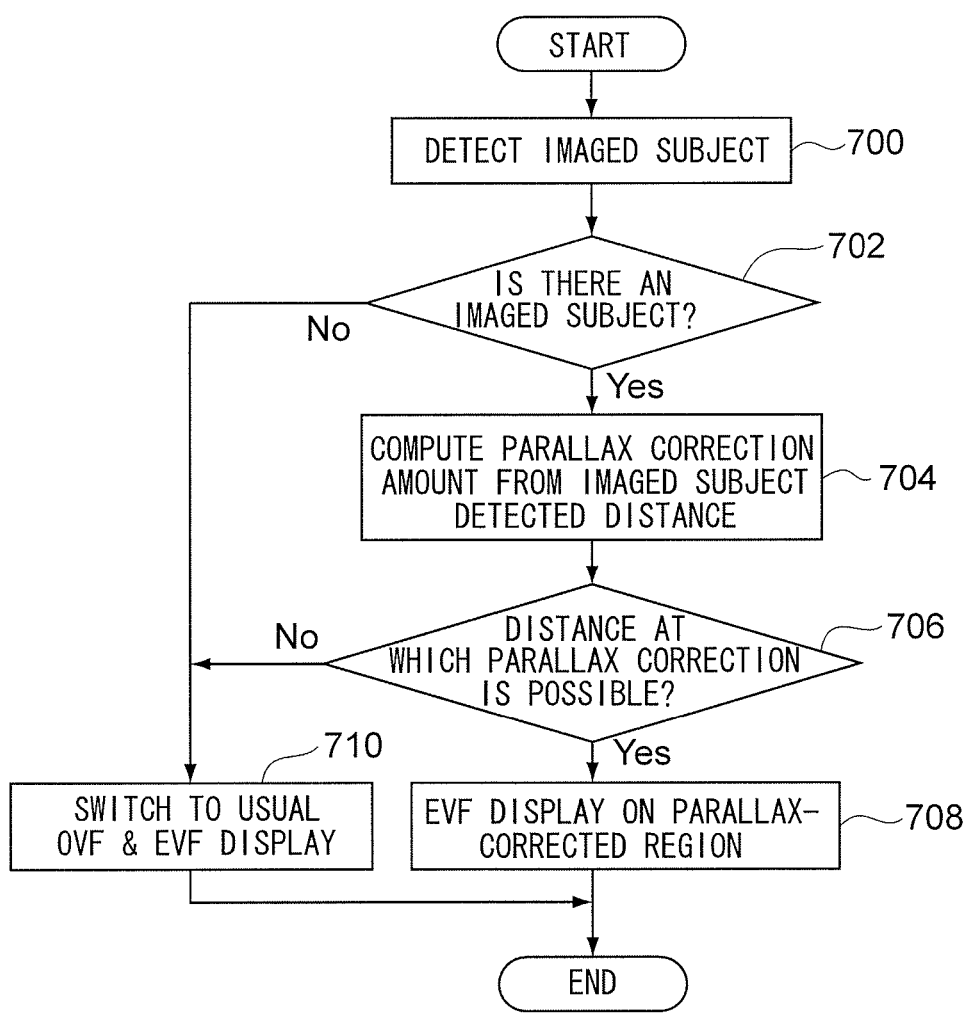
FIG. 17 is a flowchart illustrating an example of the flow of parallax correction processing.

FIG. 17 is a flowchart illustrating an example of the flow of parallax correction processing. Note that this parallax correction processing is executed during display in the HVF display mode.

In step 700, the photographic subject (here, the face of a person) is detected at the face detecting section 74.

In step 702, on the basis of the results of detection from the face detecting section 74, it is judged whether or not a photographic subject exists in the photographing region. If the judgment in step 702 is affirmative, the routine proceeds to step 704.

In step 704, on the basis of the photographic subject distance that is detected at the distance measuring section 76 (hereinafter called photographic subject detected distance), a parallax correction amount (a correction amount of the position of the EVF image) is computed. As described above, the shorter the photographic subject detected distance, the greater the parallax, and therefore, the parallax correction amount is computed by using a computational formula that is such that, the shorter the photographic subject detected distance, the greater the parallax correction amount. Note that a table in which photographic subject detected distances and parallax correction amounts are set in correspondence may be stored in a storage, and the parallax correction amount may be determined by referring to this table.

Figure 16B:
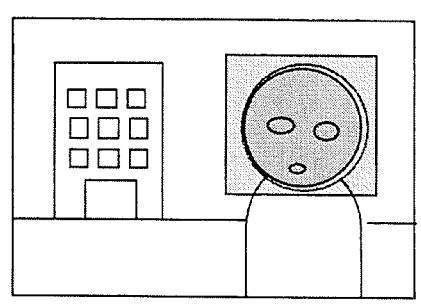
FIG. 16B is a drawing illustrating an HVF display state with parallax correction.

By the way, there are cases in which, because the photographic subject detected distance is too short, the parallax is too large, and a large part of the photographic subject that is detected does not exist in the OVF image. In such a case, even if the EVF image is superposed on the OVF image with the position of the EVF image being offset by the aforementioned computed parallax correction amount, the photographing effects of the photographic subject cannot be confirmed. Such a photographic subject detected distance cannot be said to be a distance at which parallax correction is possible. Thus, in step 706, from the position of the detected photographic subject and the aforementioned computed parallax correction amount, it is judged whether or not the photographic subject detected distance is a distance at which parallax correction is possible. If it is judged to be possible, in step 708, the digital signal processing section 60 is controlled, and the position of the EVF image is corrected by the aforementioned computed parallax correction amount, and the EVF image is displayed (refer to FIG. 16B as well).

On the other hand, if it is judged in step 706 that the photographic subject detected distance is a distance at which parallax correction is not possible, in step 710, the EVF image is displayed by usual display, i.e., at the position without parallax correction (the photographic subject detected position).

As described above, by taking into consideration the parallax between the EVF image and the OVF image during the HVF display mode and carrying out correction such that the both images can be displayed, the effects of parallax can be reduced and the EVF image can be displayed at the correct position, even in a state in which the EVF image is superposed merely on the position of the photographic subject.

Note that a sensor that detects whether or not the user has set his eye close to the eyepiece portion 18 may be provided. In this case, for example, after changing of the settings of the photographing conditions, before switching from the OVF display mode to the HVF display mode (e.g., between step 100 and step 102 of FIG. 5, or between step 200 and step 202 of FIG. 7), there can be provided a step that judges whether or not the user has set his eye close to the eyepiece portion 18. If it is judged that the user has set his eye close, the next step, i.e., processing of switching to the HVF display mode, may be carried out. Due thereto, after changing of the settings, the display can be switched at the time when the user looks through the eyepiece portion 18.

What is claimed is:

1. A photography device comprising:
   a display control section that effects control such that an electronic image, that is obtained by capturing a photographic subject via a photographic lens and that corresponds to set photographing conditions, is displayed on a display portion;
   a guiding section that guides, to an eyepiece portion, at least one of an electronic image displayed on the display portion and an optical image of the photographic subject that is incident optically, or a composite image that merges both; and
   a guiding control section that, in a state in which the optical image has been guided to the eyepiece portion and the electronic image and the composite image have not been guided to the eyepiece portion, if the photographing conditions are changed, carries out first control that controls the guiding section such that the composite image is guided to the eyepiece portion, and, if a predetermined time elapses after the first control or a predetermined operation is carried out by a user after the first control, carries out second control that controls the guiding section such that the optical image is guided to the eyepiece portion and the electronic image and the composite image are not guided to the eyepiece portion.

2. The photography device of claim 1, further comprising:
   a scene recognizing section that recognizes a photographed scene; and a changing section that changes the photographing conditions in accordance with the photographed scene recognized by the scene recognizing section.

3. The photography device of claim 1, wherein, during a time period in which the first control by the guiding control section is being carried out, the display control section effects control such that a luminance of the electronic image becomes a luminance at which viewability of the electronic image improves.

4. The photography device of claim 1, wherein the composite image that is guided to the eyepiece portion is an image in which at least a portion of the electronic image is disposed at a predetermined region of the optical image.

5. The photography device of claim 4, further comprising:
a comparing section that compares luminance of the electronic image and brightness of the photographing environment,
wherein, in a case in which it is judged, on the basis of results of comparison of the comparing section, that the viewability of the electronic image will not improve even if the luminance of the electronic image is adjusted, the guiding control section controls the guiding section such that a composite image, that is obtained by light-blocking an image of the predetermined region of the optical image, is guided to the eyepiece portion.

6. The photography device of claim 3, further comprising:
a comparing section that compares luminance of the electronic image and brightness of the photographing environment,
wherein, in a case in which it is judged, on the basis of results of comparison of the comparing section, that the viewability of the electronic image will not improve even if the luminance of the electronic image is adjusted, the guiding control section carries out, instead of the first control, third control that controls the guiding section such that the electronic image is guided to the eyepiece portion and the optical image and the composite image are not guided to the eyepiece portion.

7. The photography device of claim 1, further comprising:
a detecting section that detects a position of a photographic subject from the electronic image,
wherein the composite image that is guided to the eyepiece portion is an image in which the electronic image, that includes the photographic subject, is superposed on a position of the photographic subject, that is detected by the detecting section, of the optical image.

8. The photography device of claim 7, further comprising:
a measuring section that measures a photographic subject distance; and
a correction amount computing section that, on the basis of the photographic subject distance that is measured by the measuring section, computes a correction amount for correcting offset between the electronic image and the optical image,
wherein the composite image that is guided to the eyepiece portion is an image in which the electronic image, that includes the detected photographic subject, is superposed on a position, that is obtained by correcting the detected position in accordance with the computed correction amount, of the optical image.

9. A display control method, wherein the method:
effects control such that an electronic image, that is obtained by capturing a photographic subject via a photographic lens and that corresponds to set photographing conditions, is displayed on a display portion; and
in a state in which, by a guiding section that guides, to an eyepiece portion, at least one of an electronic image displayed on the display portion and an optical image of the photographic subject that is incident optically, or a composite image that merges both, the optical image has been guided to the eyepiece portion and the electronic image and the composite image have not been guided to the eyepiece portion, if the photographing conditions are changed, carries out first control that controls the guiding section such that the composite image is guided to the eyepiece portion, and, if a predetermined time elapses after the first control or a predetermined operation is carried out by a user after the first control, carries out second control that controls the guiding section such that the optical image is guided to the eyepiece portion and the electronic image and the composite image are not guided to the eyepiece portion.

* * * * *